United States Patent [19]
Jeslis

[11] Patent Number: 5,154,687
[45] Date of Patent: Oct. 13, 1992

[54] ROTARY ACCUMULATOR FOR PALLET STRINGERS OR DECKING MEMBERS

[75] Inventor: David K. Jeslis, Frankfort, Ill.

[73] Assignee: Gate Pallet Systems, Inc., Crown Point, Ind.

[21] Appl. No.: 769,087

[22] Filed: Sep. 30, 1991

[51] Int. Cl.$^5$ .................. B31D 5/00; B65G 29/00; B65G 47/34; B65G 47/84

[52] U.S. Cl. .................................. 493/12; 493/29; 493/142; 493/274; 493/332; 198/478.1; 198/483.1

[58] Field of Search ................ 493/10, 12, 29, 142, 493/274, 295, 332; 198/478.1, 483.1; 414/745.1, 745.7

[56] References Cited

U.S. PATENT DOCUMENTS

| | | | |
|---|---|---|---|
| 1,812,666 | 6/1931 | Schmidt | 493/142 |
| 2,125,430 | 8/1938 | Dietmann | 493/142 |
| 3,128,881 | 4/1964 | Kuhnle | 198/483.1 |
| 4,061,231 | 12/1977 | Birdwell | 414/745.7 |
| 4,581,004 | 4/1986 | Nagata | 493/164 |
| 4,636,186 | 1/1987 | Focke et al. | 493/142 |
| 4,792,325 | 12/1988 | Schmidtke | 493/334 |
| 4,867,074 | 9/1989 | Quasnick | 108/51.3 |
| 4,938,337 | 7/1990 | Jowitt et al. | 198/478.1 |
| 5,001,991 | 3/1991 | Smith | 108/51.3 |

Primary Examiner—William E. Terrell
Attorney, Agent, or Firm—Dressler, Goldsmith, Shore, Sutker & Milnamow, Ltd.

[57] ABSTRACT

A rotary accumulator for folded beams of corrugated paperboard with adhesive applied thereto, such as pallet stringers or decking members, comprises a conveyor for feeding the beams longitudinally with spaces therebetween, a generally circular array of beam holders mounted to a rotary framework for receiving each beam in one holder, for holding such beam in a desired configuration for a finite time to allow adhesive applied thereto to cure, and for releasing such beam thereafter, a mechanism for indexing the holders in a generally circular path, and a longitudinal member for removing each beam from the beam holder holding such beam when such beam engages such members as the holders are being indexed. The mechanism is powered by a pneumatically powered piston-cylinder mechanism, which drives an escapement mechanism, or by an electric motor. Certain sensing and detecting devices are provided for controlling the mechanism.

16 Claims, 6 Drawing Sheets

ROTARY ACCUMULATOR FOR PALLET STRINGERS OR DECKING MEMBERS

TECHNICAL FIELD OF THE INVENTION

This invention pertains to a rotary accumulator for an indeterminate number of similar beams, such as pallet stringers or decking members, of a type folded from corrugated paperboard, multi-ply paper, or similar material with an adhesive applied to folded panel portions of each beam and intended to maintain such beam in a desired configuration when the adhesive has cured. The accumulator is useful to hold each beam in the desired configuration for a finite time intended to permit the adhesive applied thereto to cure sufficiently for such beam to be released without a material risk of such beam unfolding.

BACKGROUND OF THE INVENTION

As made predominantly of corrugated cardboard, multi-ply paper, or similar material, pallets of the type noted above and methods for their manufacture are exemplified in Schmidtke U.S. Pat. No. 4,792,325, Quasnick U.S. Pat. No. 4,867,074, and Smith U.S. Pat. No. 5,001,991. Typically, such a pallet comprises elongate stringers and decking members, each having a desired configuration when viewed endwise. It is convenient to refer to each stringer or decking member as a beam.

As disclosed in each of these patents, each beam has a generally trapezoidal configuration when viewed endwise, as a result of a sheet of corrugated paperboard, multi-ply paper, or similar material having been folded to form multiple panel portions, which define two symmetrical halves of such beam. The generally trapezoidal configuration has two parallel bases, namely a relatively wide base and a relatively narrow base, and two opposite, nonparallel sides extending between the relatively wide and relatively narrow bases. The trapezoidal configuration has two relatively widely spaced edges defining acute angles where the sides intersect the relatively wide base and two relatively narrowly spaced edges defining obtuse angles where the sides intersect the relatively narrow base.

At various stages in the manufacture of such a beam, an adhesive is applied to certain panel portions, which are to adhere to adjacent panel portions. At one stage in its manufacture, an adhesive is applied along a medial plane between the symmetrical halves of the beam. If a so-called "cold melt" adhesive is applied along the medial plane, it is necessary to hold the beam for a finite time, e.g. fifteen to twenty seconds, to permit such adhesive to cure sufficiently before the beam can be released without a material risk of such beam unfolding.

Such beams are manufactured at high production rates, e.g. two thousand beams per hour. Thus, a need has arisen for an efficient accumulator for receiving an indeterminate number of such beams, each with an adhesive applied thereto, and for holding each beam for a finite time to permit the adhesive to cure sufficiently for such beam to be released without a material risk of such beam unfolding.

SUMMARY OF THE INVENTION

This invention responds to the need that has arisen by providing an accumulator for an indeterminate number of similar beams folded from corrugated paperboard, multi-ply paper, or similar material with an adhesive applied to each beam and intended to maintain such beam in a desired configuration when the adhesive has cured. The accumulator receives each beam and holds each beam for a finite time, e.g. about fifteen to twenty seconds, which is intended to permit the adhesive applied thereto to cure.

Broadly, an accumulator according to this invention comprises a mechanism for feeding the beams successively and longitudinally in the desired configuration, an array of beam holders similar to each other for receiving each beam from the feeding means in one of the beam holders at a receiving position and for holding such beam in the desired configuration in the beam holder receiving such beam, a mechanism for moving the array of beam holders in a nonlongitudinal path, and a mechanism or structure for removing each beam from the beam holder holding such beam after the beam holder holding such beam has been moved from the receiving position for a finite time. Each beam is held by one of the beam holders for a finite time intended to permit the adhesive applied to such beam to cure.

So as to adapt the accumulator to each beam having a generally trapezoidal configuration when viewed endwise with two parallel bases, namely a relatively wide base and a relatively narrow base, with two opposite nonparallel sides extending between the relatively wide and relatively narrow bases, with two relatively widely spaced edges defining acute angles where the sides intersect the relatively wide base, and with two relatively narrowly spaced edges defining obtuse angles where the sides intersect the relatively narrow base, each beam holder may conform generally to the acute angle defined by the relatively widely spaced edges of each beam. Moreover, each beam holder may define a downwardly opening cavity having an open end and being configured to receive such a beam being fed into the open end by the feeding mechanism while such beam holder remains in the receiving position. Preferably, each beam holder defines a laterally spaced pair of interior angles conforming generally to the acute angles defined by the relatively widely spaced edges of each beam.

This invention may be advantageously embodied in a rotary accumulator comprising a supporting framework and a comprising mechanism for feeding the beams successively and longitudinally with each beam in the desired configuration. Also, the rotary accumulator comprises a rotary framework mounted rotatably to the supporting framework and a generally circular array of beam holders, which are similar to each other. The beam holders are mounted to the rotary framework and are rotatable with the rotatable framework. The beam holders receive each beam from the feeding mechanism in one of the beam holders at a receiving position and for holding such beam in the desired configuration, for a finite time, in the beam holder receiving such beam.

Moreover, the rotary accumulator comprises a mechanism for rotating the rotary framework in a forward direction to rotate the array of beam holders in a generally circular path about a longitudinal axis, along with a mechanism for removing each beam from the beam holder holding such beam after such holder has been moved from the receiving position over a substantial portion of he generally circular path, e.g. over about three-fourths of such path. A finite time is required for each of the beam holders to move from the receiving position over a substantial portion of such path.

Preferably, the feeding mechanism is arranged to feed the beams continuously with a space between each beam being fed and the next beam being fed. The mechanism for rotating the rotary framework may be then arranged to index the array of beam holders in the generally circular path in such manner that each beam holder remains in the receiving position for a sufficient time to receive one of the beams being fed by the feeding mechanism. The mechanism for rotating the rotary framework may conform to either of two alternative arrangements.

In a first arrangement, the framework-rotating mechanism is actuatable to rotate the rotary framework in a forward direction for a timed interval. Also, a sensor is provided for sensing of the beams being fed by the feeding mechanism, and for actuating the framework-rotating mechanism to do so when the sensor begins to sense such a beam. The sensor may be also arranged to deactuate the feeding mechanism and the framework rotating mechanism if a beam sensed by the sensor does not pass the sensor within a predetermined time.

Preferably, in the first arrangement, the framework-rotating mechanism comprises a piston-cylinder mechanism, a sprocket wheel mounted to the rotary framework for conjoint rotation with the rotary framework and with the array of beam holders and provided with a circumferential array of teeth, and an escapement mechanism driven by the piston-cylinder mechanism and coactive with the teeth for indexing the sprocket wheel so as to index the array of beam holders. Preferably, moreover, a proximity detector is provided for detecting the teeth as the sprocket wheel is rotated and for operating the piston-cylinder mechanism, so as to arrest the sprocket wheel, when the proximity detector detects that the sprocket wheel has been rotated for a sufficient amount of angular rotation to move one of the beam holders from the receiving position and to move another of the beam holders into the receiving position.

In a second arrangement, the mechanism for rotating the rotary framework is actuatable to rotate the rotary framework in a forward direction and is arranged to be selectively actuated and deactuated. Also, a sensor is provided for sensing one of the beams being fed by the feeding mechanism and for actuating such mechanism when he sensor begins to sense such a beam.

Preferably, in the second arrangement, the mechanism for rotating the rotary framework, comprises an electric motor mounted on the supporting framework actuatable to rotate the rotary framework in a forward direction, and arranged to be selectively actuated and deactuated via the sensor. Moreover, in the second arrangement, such mechanism comprises a sprocket wheel mounted to the rotary framework for conjoint rotation with the rotary framework and with the array of beam holders and provided with a circumferential array of teeth, and along with mechanisms comprising a pneumatically powered piston-cylinder mechanism and a pawl driven by the piston-cylinder mechanism and coactive with the teeth for deactuating the electric motor and for arresting the sprocket wheel when the rotary framework has been rotated for a sufficient angle to move one of the beam holders from the receiving position and to move another of the beam holders into the receiving position.

Preferably, moreover, a proximity detector is provided, which is arranged to deactuate the electric motor and simultaneously to actuate the piston-cylinder mechanism so as to arrest the sprocket wheel whenever the proximity detector detects that the sprocket wheel has been rotated for a sufficient amount of angular rotation to move one of the beam holders from the receiving position and to move another of the beam holders into the receiving position.

In one contemplated embodiment according to either arrangement noted above, the supporting framework comprises an upper frame and a lower frame. The upper frame supports the rotary framework and the array of beam holders for conjoint rotation relative to the upper frame. The lower frame supports the upper frame. Moreover, a mechanism is provided for lifting a portion of the upper frame relative to the lower frame so as to lift the array of beam holders relative to the feeding mechanism prior to rotating the array of beam holders.

Preferably, in the aforenoted embodiment, the upper frame is mounted pivotally to the lower frame so as to permit pivotal movement of the upper frame about a longitudinal axis near a given side of the upper frame. Preferably, moreover, the lifting mechanism is arranged to lift the upper frame near the upper side of the upper frame so as to lift the array of beam holders relative to the feeding mechanism prior to rotating the array of beam holders.

The beam holders may be advantageously configured to conform to the trapezoidal configuration described above if the feeding mechanism s arranged to feed the beams with the relatively wide bases above the relatively narrow bases. Thus, each beam holder may define a laterally spaced pair of interior angles, which conform generally to the acute angles defined by the relatively widely spaced edges of each beam, and which define a downwardly open cavity having an open end and being configured to receive such a beam being fed into the open end by the feeding mechanism while such beam holder remains in the receiving position. Also, if each beam holder defines such a cavity, the rotary accumulator comprises a mechanism for indexing the rotary framework in a forward direction about a longitudinal axis in such manner that each beam holder remains in the receiving position for a sufficient time to receive such a beam being fed into the open end of such beam holder by the feeding means.

The mechanism for removing each beam may comprise a longitudinally extending bar mounted to the supporting framework and disposed so as to be stricken by such a beam being held by a given one of the beam holders as the given one of the beam holders is moved past the longitudinal member. Preferably, the bar is movable over a limited range of lateral movement toward and away from the array of beam holders, and the bar is biased toward the array of beam holders.

These and other objects, features, and advantages of this invention are evident from the following description of two alternate embodiments of this invention with reference to the accompanying drawings.

DETAILED DESCRIPTION OF ILLUSTRATED EMBODIMENTS

Figure 1:
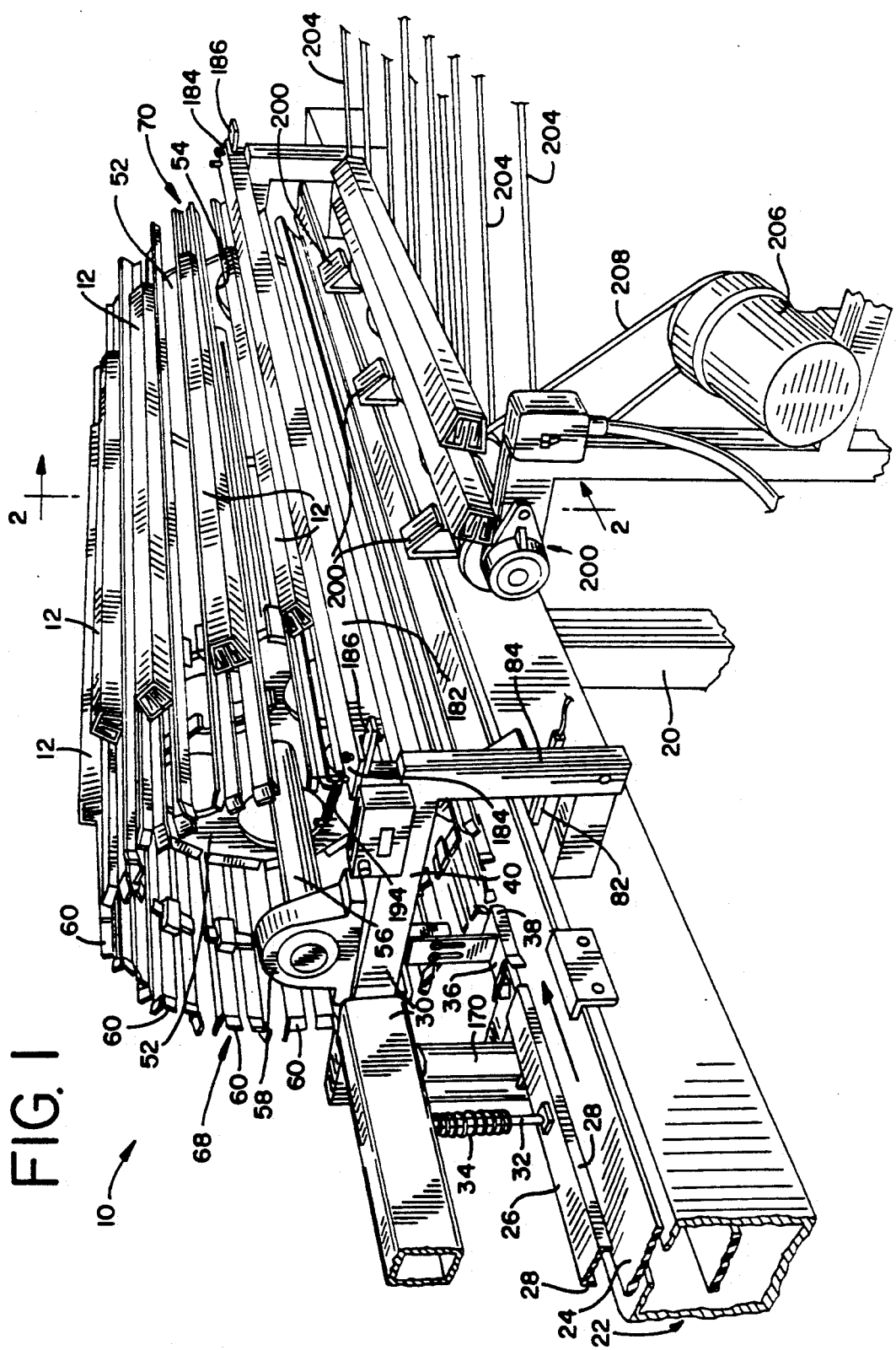
FIG. 1 is a perspective view of a rotary accumulator constituting a first embodiment of this invention.
Figure 2:
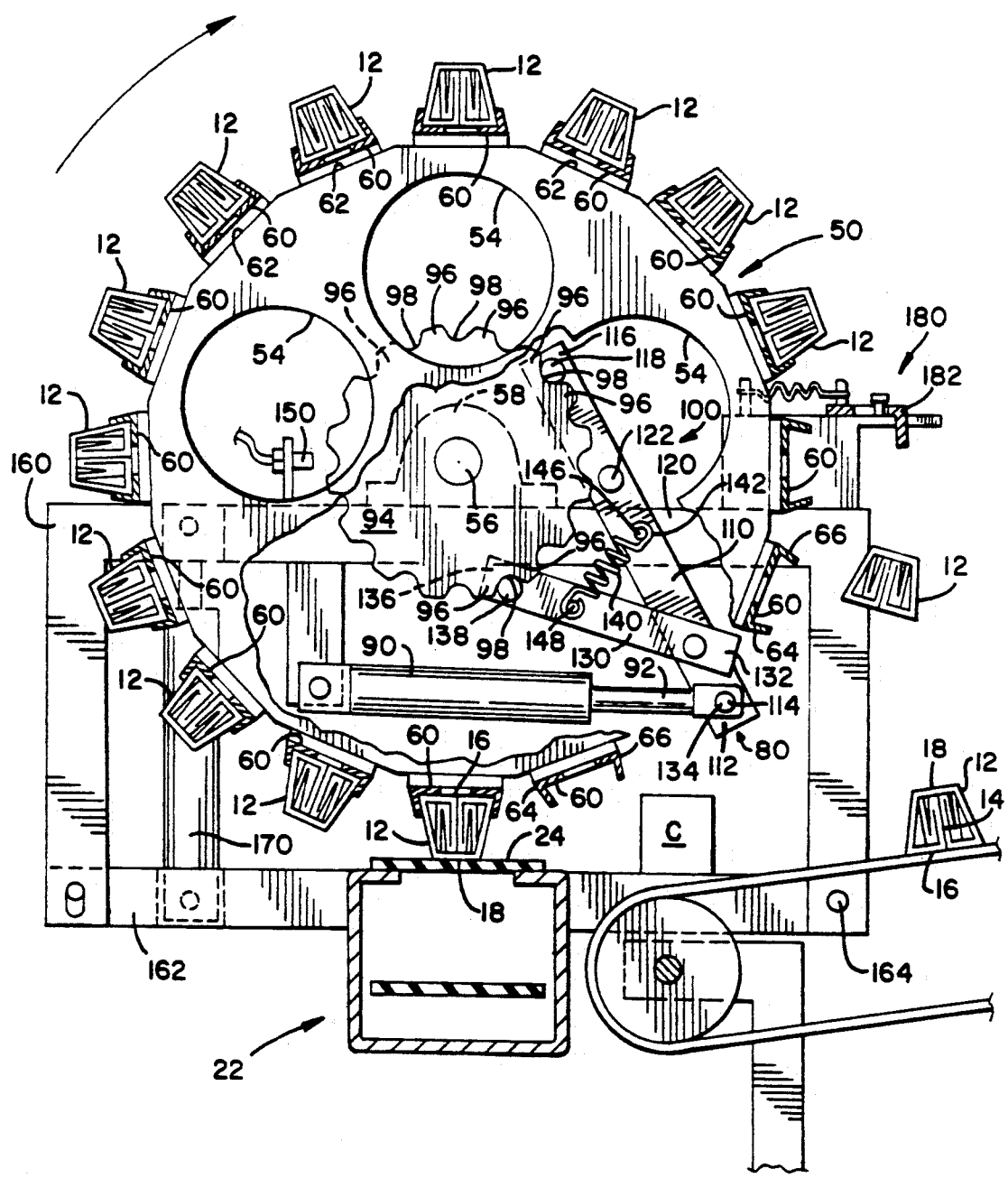
FIG. 2 is a partly broken away, sectional view taken along line 2—2 of FIG. 1 in a direction indicated by arrows.
Figure 3:
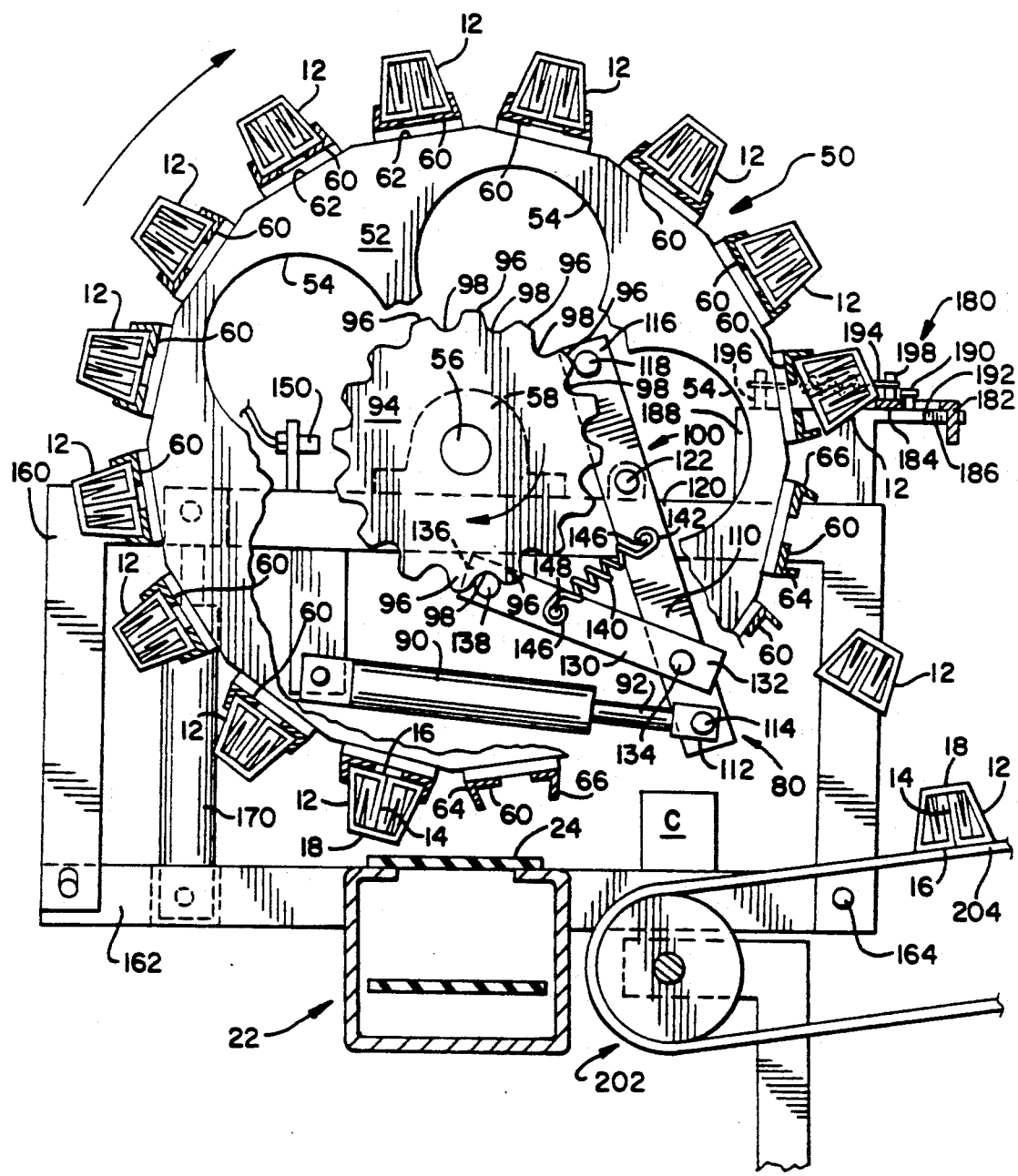
FIG. 3 is a view similar to FIG. 2 but showing certain elements in changed positions.

As shown in FIGS. 1, 2, and 3, a rotary accumulator 10 constituting a first embodiment of this invention is used to accumulate an indeterminate number of similar decking members 12, which are folded from corrugated paperboard with an adhesive applied to folded panel portions of each member 12 to maintain each member 12 in a desired configuration. The desired configuration is generally trapezoidal when viewed endwise. The accumulator 10 is used to hold each member 12 in the desired configuration for a finite time, e.g. about fifteen to twenty seconds, to permit the adhesive to cure sufficiently for such member 12 to be released without a material risk of such member 12 unfolding at the medial plane 14.

Each decking member 12 may be substantially similar to the decking members disclosed in Schmidtke U.S. Pat. No. 4,792,325, Quasnick U.S. Pat. No. 4,867,074, and Smith U.S. Pat. No. 5,001,991, the disclosures of which patents are incorporated herein by reference. Thus, each member 12 has two symmetrical halves defined by folded panel portions and joined by a common panel portion. The symmetrical halves define a medial plane 14, along which the adhesive is applied at a late stage in the manufacture of such member 12. When cured, the adhesive applied along the medial plane 14 maintains such member 12 in the desired, generally trapezoidal configuration. It is preferred to use a so-called "cold melt" adhesive, such as Code No. 3715 adhesive or Code No. 3715B adhesive, both being available commercially from H.B. Fuller Co. of Palatine, Illinois.

As shown in FIGS. 2 and 3, the desired, generally trapezoidal configuration of each decking member 12 has two parallel bases, namely a relatively wide base 16 defining the top of such decking member 12 in normal use and a relatively narrow base 18 defining the bottom of such member 12 in normal use. Such configuration has two opposite, nonparallel sides, which extend between the relatively wide and relatively narrow bases. Such configuration has two relatively widely spaced edges, which define similar, acute angles where the sides intersect the relatively wide base 16, and two relatively narrowly spaced edges, which define similar, obtuse angles where the sides intersect the relatively narrow base 18.

As shown in FIG. 1, the accumulator 10 comprises a supporting framework 20 nd a mechanism 22 for feeding the decking members 12 successively and longitudinally in the desired, generally trapezoidal configuration with the relatively wide base 16 of each member 12 above the relatively narrow base 18 of such member 12. The feeding mechanism 22 is arranged to feed the decking members 12 with a space between each member 12 being fed and the next member 12 being fed. The space therebetween is sufficient to permit indexing as described below.

The feeding mechanism 22 comprises a belt conveyor 24, which is arranged to feed each decking member 12 with a its relatively narrow base 18 on the belt conveyor 24. The belt conveyor 24 is arranged to operate continuously and to feed the decking members 12 with the aforenoted space between each decking member 12 being fed and the next decking member 12. The feeding mechanism 22 comprises a pressure plate 26 with downturned flanges 28, which extend longitudinally, and which are spaced so as to accommodate the relatively wide bases 16 of the decking members 12 between the flanges 28. The pressure plate 26 is mounted to a separate framework 30 via vertical telescoping members 32 (one shown) and is biased downwardly by coiled springs 34 (one shown) deployed on the members 32, so as to press downwardly on each member 12 being fed, and so as to confine the relatively widely spaced edges of such member 12 between the flanges 28. Also, the feeding mechanism 22 comprises a guide plate 36 with downturned flanges 38 and with flared leading edges. The guide plate 36 is mounted to an overlying portion 40 of the framework 20, in a fixed but adjustable position, so as to receive each member 12 shortly after such member 12 leaves the pressure plate 26. The guide plate 36 confines each member 12 in he desired configuration as such member 12 passes under the guide plate 36, between the flanges 38.

The accumulator 10 comprises a rotary framework 50, which comprises two sixteen-sided, regular polygonal plates 52, which have enlarged, circular apertures 54 to reduce their weights, and a longitudinal shaft 56, on which the respective plates 52 are mounted so as to be conjointly rotatable with the shaft 56. At its opposite ends, the shaft 56 is journalled in journal blocks 58, which are mounted on the supporting framework 20. The accumulator 10 comprises sixteen holders 60 for the decking members 12. Each holder 60 is mounted fixedly on an associated one of sixteen flat edges 62 of each polygonal plate 52. Because the polygonal plates 52 are sixteen-sided so as to have generally circular shapes, the holders 60 are arranged in a generally circular array about a longitudinal axis, which is defined by the shaft 56, so as to be conjointly rotatable with such plates 52 and with the shaft 56.

Each holder 60 is adapted to receive a decking member 12 from the feeding mechanism 22 when such holder 60 is in a receiving position, in which such holder 60 is disposed above the belt conveyor 24, and to hold such member 12 in the desired trapezoidal configuration, for a finite time. Thus, each holder 60 comprises a laterally spaced pair of elongate, flanged pieces 64, 66, which are mounted fixedly on the associated edges 62 of the polygonal plates 52. The flanged pieces 64, 66, define a laterally spaced pair of interior angles, which conform generally to the acute angles defined by the relatively widely spaced edges of the decking members 12. Also, the flanged pieces 64, 66, define a downwardly open cavity, which is open at its opposite ends. As shown in FIG. 1, the flanged pieces 64, 66, are flared at an entry end 68 of each holder 60. Thus, each holder 60 is configured to receive a decking member 12 being fed into the entry end 68 of such holder 60 by the feeding mechanism 22 while such holder 60 remains in the receiving position. The opposite end 70 of each holder 60 is open so as to permit a decking member 12 to be withdrawn through such end 70 if the accumulator 10 jams or stalls.

The accumulator 10 comprises a mechanism 80 for rotating the rotary framework 50 in a forward direction (which is clockwise in FIGS. 2 and 3) to rotate the array of decking member holders 60 in a generally circular path about the longitudinal axis defined by the shaft 56. The mechanism 80 is arranged to index the array of decking member holders 60 in the generally circular path in such manner that each holder 60 remains in the receiving position for a sufficient time to receive one of the decking members 12 being fed by the feeding mechanism 22.

The mechanism 80 is controlled by a programmable controller C shown diagrammatically in FIGS. 2 and 3. The mechanism 80 is actuatable to rotate the rotary framework 50 in the forward direction for a timed interval, which is controlled by the programmable controller C. As shown in FIG. 1, a photoelectric sensor 82 is mounted to an upright portion 84 of the supporting framework 20. The sensor 82 is connected operatively to the programmable controller C. The sensor 82 is arranged to detect a decking member 12 being conveyed past the sensor 82 and to actuate the mechanism 80, via the programmable controller C, so as to rotate the rotary framework 50 in the forward direction for such an interval when the sensor 82 begins to detect such a member 12.

As shown in FIGS. 2 and 3, the mechanism 80 comprises a double-acting, pneumatic, piston-cylinder mechanism 90 having piston rod 92, a sprocket wheel 94 having a circumferential array of teeth 96 with depressions 98 between the teeth 96, and an escapement mechanism 100. The piston-cylinder mechanism 90 is connected to a source (not shown) of pressurized air and is controlled by valves (not shown) which are controlled by the programmable controller C. The sprocket wheel 94 is mounted to the shaft 56 for conjoint rotation with the shaft 56 and with the rotary framework 50. The escapement mechanism 100 is driven by the piston-cylinder mechanism 90 and is coactive with the teeth 96 for indexing the sprocket wheel 94 so as to index the rotary framework 50 and the array of holders 60 and for arresting the sprocket wheel 94 with one such holder 60 in the receiving position.

The sensor 82 is arranged to actuate the piston-cylinder mechanism 90, via the programmable controller C, so as to retract the piston rod 92 from a fully extended position (see FIG. 2) after a timed interval beginning when the sensor 82 begins to detect a decking member 12 being fed past the sensor 82 by the conveyor belt 24. The programmable controller C is arranged to actuate the piston-cylinder mechanism 90 oppositely, so as to extend the piston rod 92, in a manner to be later described. The timed interval is coordinated with the overall length of each member 12.

The escapement mechanism 100 comprises a pair of coactive links operated by the piston-cylinder mechanism 80. A longer link 110 has a proximal end 112 connected pivotally to the piston rod 92, via a pin 114, and a distal end 116. A roller 118 is mounted rotatably to the longer link 110, near the distal end 116. The longer link 110 is mounted pivotally to a transverse portion 120 of the supporting framework 20, via a pin 122 at an intermediate location closer to the distal end 116. A shorter link 130 has a proximal end 132 connected pivotally to the longer link 110, via a pin 134 near the proximal end 112, and a distal end 136. A roller 138 is mounted rotatably to he shorter link 130, near the distal end 136. The escapement mechanism 100 comprises a coiled spring 140 having a first end 142 connected to the longer link 110, via a pintle 144 between the pin 122 and the pin 134 and near the pin 122, and a second end 146 connected to the shorter link 130, via a pintle 144 between the pin 134 and the pin 138 and near the pin 134.

The escapement mechanism 100 is arranged to operate in a cyclic manner. When the piston rod 92 is extended fully, the roller 138 near the distal end 116 of the shorter link 1340 is moved by the longer link 110 into a given depression 98 of the sprocket wheel 94 and the roller 118 near the distal end 116 of the longer link 110 is biased by the coiled spring 140 into another depression 98 spaced angularly from the given depression 98 by several teeth 96, as shown in FIG. 2. As the piston rod 92 is retracted, the pin 138 causes the sprocket wheel 94 to rotate in the forward direction, as suggested by arrows in FIG. 3. Also, as the piston rod 92 is retracted, the roller 118 is cammed from the depression 98 spaced angularly from the given depression 98. over an adjacent tooth 96, into the next depression 98 in the rearward direction. Thus, when the piston rod 92 is extended again, the roller 138 is cammed from the given depression 98, over an adjacent tooth 96, into the next depression 98 in the rearward direction.

A proximity detector 150, which is connected operatively to the programmable controller C, is arranged to detect the teeth 96 as the sprocket wheel 94 is rotated. The proximity detector 150 is arranged to actuate the piston-cylinder mechanism 80, via the valves controlled by the programmable controller C, so as to extend the piston rod 92 to the fully extended position, thereby to arrest the sprocket wheel 94, the rotary framework 50, and the array of holders 60, when the proximity detector 150 detects that the sprocket wheel 94 has been rotated for a sufficient amount of angular rotation to move one holder 60 from the receiving position and to move another holder 60 into the receiving position. As shown, each depression 98 is centered angularly on he sprocket wheel 94 where one holder 60 is centered angularly in the generally circular array, whereby angular rotation of one sprocket toot 96 past the proximity detector 150 is sufficient to do so.

As shown, the supporting framework 20 comprises an upper frame 160 and a lower frame 162. The upper frame 160 is mounted pivotally to the lower frame 162, via pivot pins 164 (one shown) extending longitudinally along a given side of the accumulator 10. The feeding mechanism 22 is mounted operatively to the lower frame 162. The journal blocks 58, in which the shaft 56 supporting the polygonal plates 52 of the rotary framework 50 is journalled, are mounted on the upper frame 160. A pair of similar, pneumatic, piston-cylinder mechanisms 170, which are controlled by the programmable controller C, are mounted operatively between the upper frame 160 and the lower frame 162. The piston-cylinder mechanisms 170 are arranged to pivot the upper frame 160 upwardly relative to the lower frame 162, so as to lit a decking member 12 being held by a holder 60 in the receiving position, when the rotary framework 50 is being rotated. Thus, the decking member 12 being held therein is lifted above the conveyor belt 24, whereby where is minimal risk that friction between such member 12 and the conveyor belt 24 can pull such member 12 from the holder 60 being moved from the receiving position.

A mechanism 180 is provided for removing each decking member 12 from the holder holding such decking member 12 after such holder 60 has been moved from the receiving position over about three-fourths of the generally circular path of rotation of the array of holders 60. The mechanism 180 comprises an elongate, flanged bar 182, which is mounted to the upper frame 160, near the given side of the supporting framework 20, so as to permit the bar 182 to be laterally moved over a limited range of lateral motion. The bar 182 is based inwardly toward the array of holders 60. The bar 182 is disposed to be stricken by a decking member 12, as the holder 60 holding such member 12 is moved past the bar 182, in such manner that the bar 182 knocks such member 12 from such holder 60.

At each end, the bar 182 has a horizontal, longitudinally extending flange 184, which overlies a horizontal, laterally extending flange 186 of a supporting bracket 188 mounted on one of the crosspieces 166 of the upper frame 160. Moreover, at each end, a pin 190 extends upwardly from the associated flange 186, through a laterally extending slot 192 in the associated flange 184, so as to define the limited range of lateral motion of the bar 182. Two similar, coiled springs 194 are used to bias the bar 182 toward the array of holders 60. An inner end of each spring 194 is connected to a post 196, which extends upwardly from the associated bracket 188, and an outer end of such spring 194 is connected to a post 198, which extends upwardly from the bar 182. As shown in FIG. 1, the framework 20 mounts an array of inclined, longitudinally spaced, deflecting members 200, which are disposed to deflect the decking members 12 knocked from the holders 60 by the bar 182.

A conveyor 202, which is installed next to the accumulator 10, is disposed to receive the decking members 12 deflected by the deflecting members 200. As shown in FIG. 1, the conveyor 202 comprises a longitudinally spaced array of small-diameter, of endless elements 204. Also, he conveyor 202 is driven by an electric motor 206, via a driving belt 208. The conveyor 202 is used to convey such members 12 away from the accumulator 10.

Figure 4:
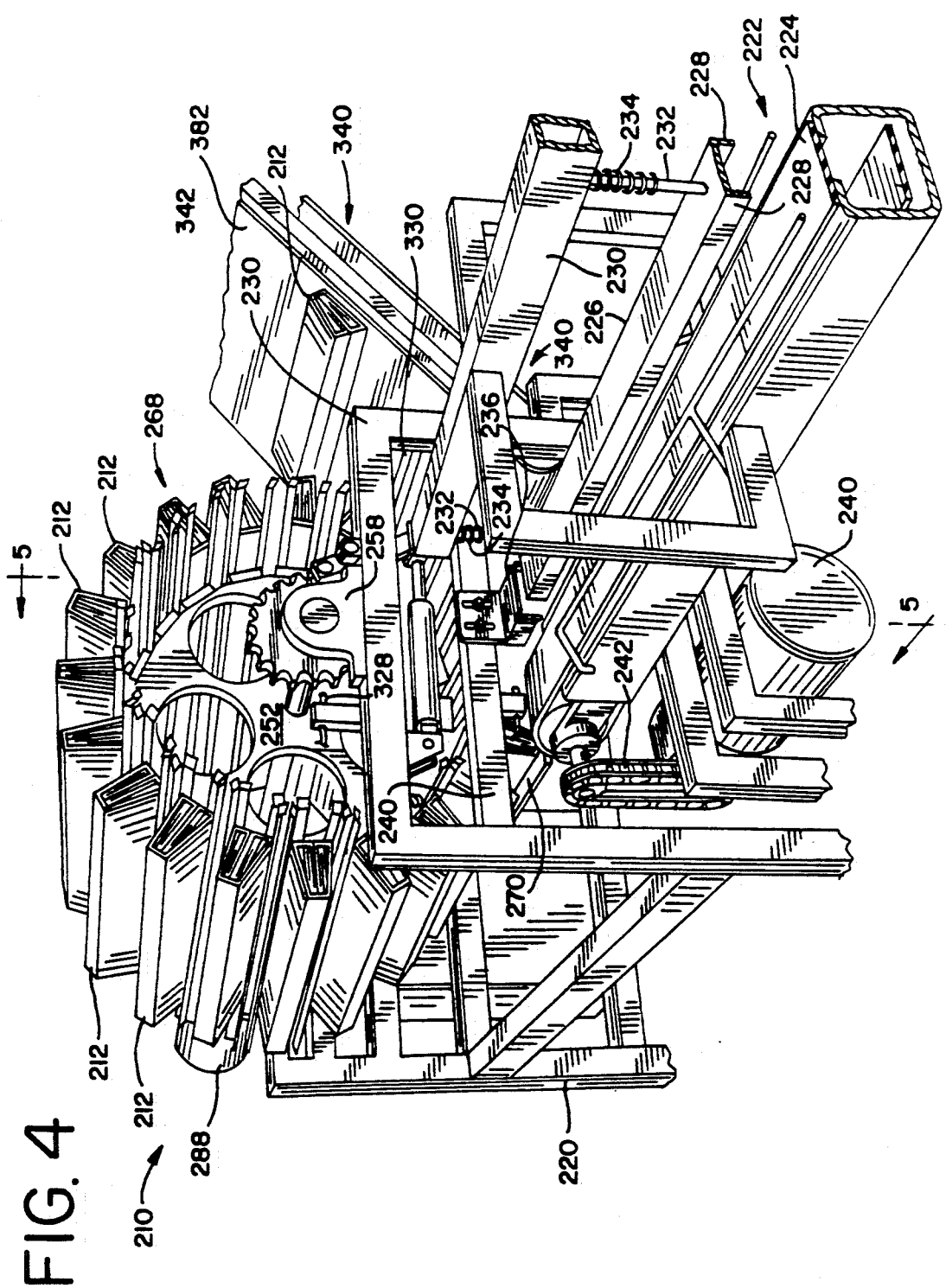
FIG. 4 is a perspective view of a rotary accumulator constituting a second embodiment of this invention.
Figure 5:
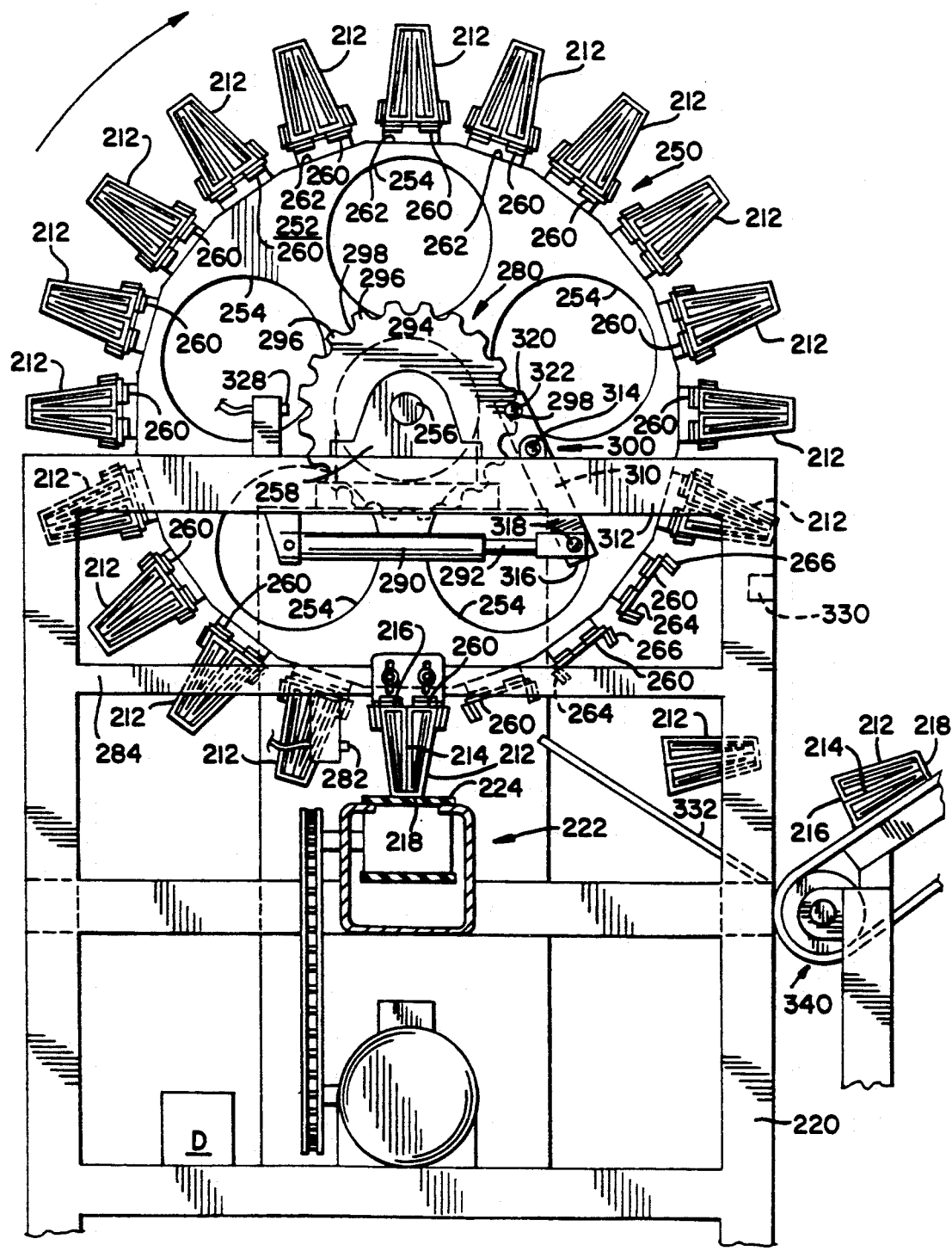
FIG. 5 is a partly broken away, sectional view taken along line 5—5 of FIG. 1 in a direction indicated by arrows.
Figure 6:
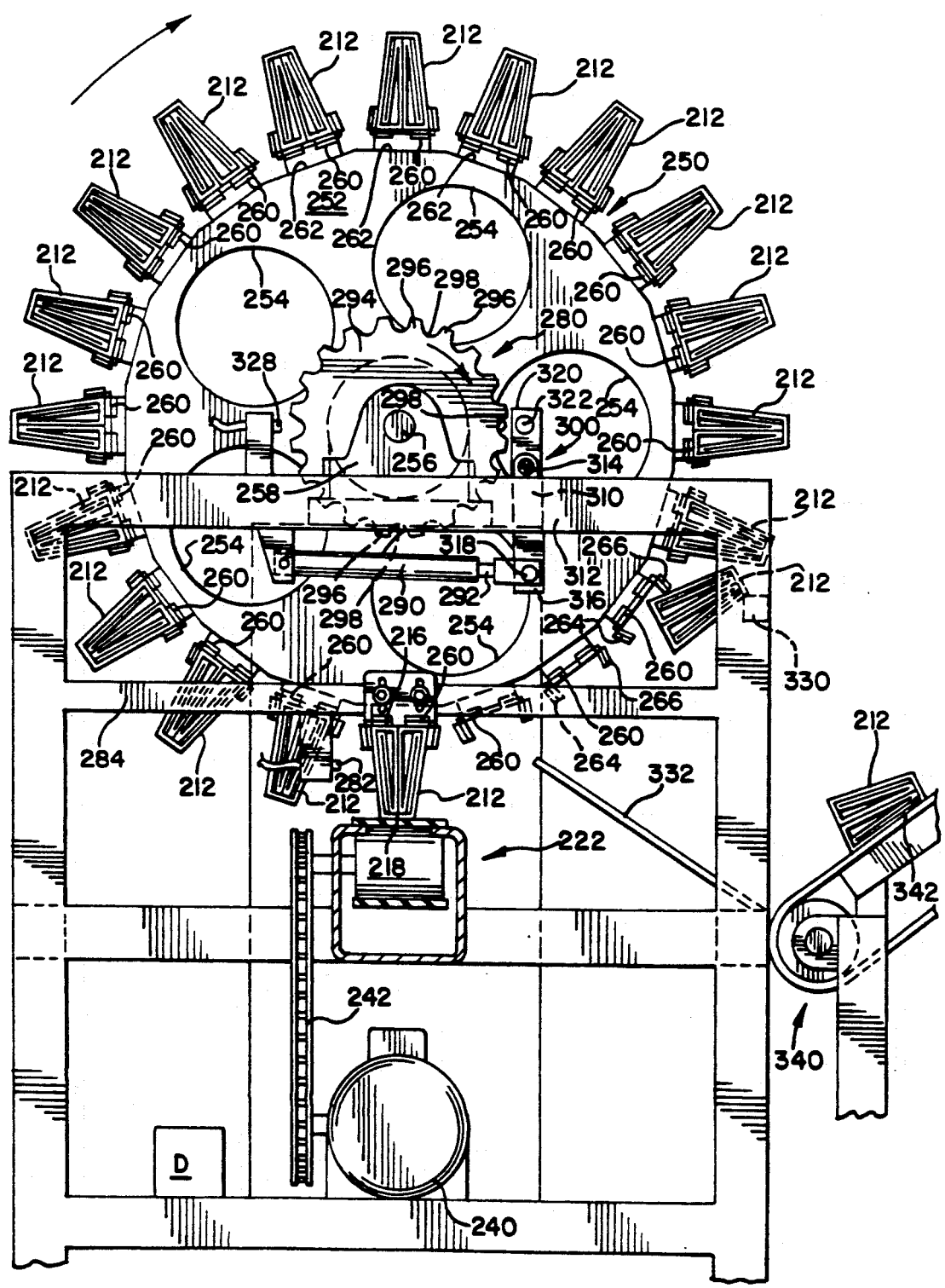
FIG. 6 is a view similar to FIG. 5 but showing certain elements in changed positions.

As shown in FIGS. 4, 5, and 6, a rotary accumulator 210 constituting a second embodiment of this invention is used to accumulate an indeterminate number of similar stringers 212, which are folded from corrugated paperboard with an adhesive applied to folded panel portions of each stringer 212 to maintain each stringer 212 is a desired configuration. The desired configuration is generally trapezoidal when viewed endwise. The accumulator 210 is used to hold each stringer 212 in the desired configuration for a finite time, e.g. about six seconds, to permit the adhesive to cure sufficiently for such stringer 212 to be released without a material risk of such stringer 212 unfolding at the medial plane 214.

Each stringer 212 may be substantially similar to the stringers disclosed in he Schmidtke, Quasnick, and Smith patents, supra. Thus, each stringer 212 has two symmetrical halves defined by folded panel portions and joined by a common panel portion. The symmetrical halves define a medial plane 214, along which the adhesive is applied at a late stage in the manufacture of such stringer 212. When cured, the adhesive applied along the medial plane 214 maintains such stringer 212 in the desired, generally trapezoidal configuration. It is preferred to use a so-called "cold melt" adhesive, such as Code No. 3715 adhesive or Code No. 3715B adhesive, both being available commercially from H.B. Fuller Co. of Palatine, Illinois.

The desired, generally trapezoidal configuration of each stringer 212 has two parallel bases, namely a relatively wide base 216 defining the top of such stringer 12 in normal use and a relatively narrow base 218 defining the bottom of such stringer 212 in normal use. Such configuration has two opposite, nonparallel sides, which extend between the relatively wide and relatively narrow bases. Such configuration has two relatively widely spaced edges, which define similar, acute angles where the sides intersect the relatively wide base 216, and two relatively narrowly spaced edges, which define similar, obtuse angles where the sides intersect the relatively narrow base 218.

The accumulator 210 comprises a supporting framework 220 and a mechanism 222, which is mounted operatively to the framework 220, for feeding the stringers 212 successively and longitudinally in the desired, trapezoidal configuration with the relatively wide base 216 of each stringer 212 above the relatively narrow base 218 of such member 12. The feeding mechanism 22 is arranged to feed the stringers 212 with a space between each stringer 212 being fed and the next stringer 212 being fed. The space therebetween is sufficient to permit indexing as described below. The feeding mechanism 222 comprises a belt conveyor 224, which is arranged to feed each stringer 212 with its relatively narrow base 218 on the conveyor belt 24. As shown, the conveyor belt 224 is driven by an electric motor 240, via a driving chain 242.

The belt conveyor 224 is arranged to operate continuously and to feed the stringers 212 with the aforenoted space between each stringer 212 being fed and the next stringer 212. The feeding mechanism 222 comprises a pressure plate 226 with downturned flanges 228, which extend longitudinally and which are spaced so as to accommodate the relatively wide bases 216 of the stringers 212 between the flanges 228. The pressure plate 226 is mounted to a separate framework 230 via vertical telescoping members 232 and is biased downwardly by coiled springs 234 (one shown) deployed on the members 232 so as to press downwardly on each stringer 212 being fed and so as to confine the relatively widely spaced edges of such stringer 212 between the flanges 28. Also, the feeding mechanism 222 comprises a guide plate 236 with downturned flanges 238 and with flared leading edges. The guide plate 236 is mounted to an overlying portion 240 of the framework 220, in a fixed but adjustable position, so as to receive each member 212 shortly after such member 212 leaves the pressure plate 226. The guide plate 236 confines each stringer 212 in the desired configuration as such stringer 212 passes under the guide plate 236, between the flanges 238.

The accumulator 210 comprises a rotary framework 250, which comprises two twenty-sided, regular polygonal plates 252, which have enlarged, circular apertures 254 to reduce their weights, and a longitudinal shaft 256, on which the respective plates 252 are mounted so as to be conjointly rotatable with the shaft 256. At its opposite ends, the shaft 256 is journalled in journal blocks 258, which are mounted on the supporting framework 220. The accumulator 210 comprises twenty holders 260 for the stringers 212. Each holder 260 is mounted fixedly on an associated one of twenty flat edges 262 of each polygonal plate 252. Because the polygonal plates 252 are twenty-sided so as to be generally circular, the holders 260 are arranged in a generally circular array about a longitudinal axis, which is defined by the shaft 256, so as to be conjointly rotatable with such plates 252 and with the shaft 256.

Each holder 260 is adapted to receive a stringer 212 from the feeding mechanism 222 when such holder 260 is in a receiving position, in which such holder 260 is disposed above the belt conveyor 224, and to hold such member 212 in the desired, generally trapezoidal configuration, for a finite time. Thus, each holder 260 comprises a laterally spaced pair of elongate, flanged pieces 264, 266, which are mounted fixedly on the associated edges 262 of the polygonal plates 252. The flanges pieces 264, 266, define a laterally spaced pair of interior angles, which conform generally to the acute angles defines by the relatively widely spaced edges of the stringers 212. Also, the flanged pieces 264, 266, define a downwardly open cavity, which is open at its opposite ends. As shown, the flanged pieces 264, 266, are flared at an entry end 268 of such holder 260. Thus, each holder 260 is configured to receive a stringer 212 being fed into the entry end 268 of such holder 260 by the feeding mechanism 222 while such holder 260 remains in the receiving position. A plate 270 is mounted to the supporting framework 20 so as to underlie a stringer 212 entering a holder 260 in the receiving position. The plate 270 is mounted so as to be downwardly moveable to permit a jammed stringer 212 to be manually removed.

The accumulator 210 comprises a mechanism 280 for rotating the rotary framework 250 in a forward direction (which is clockwise in FIGS. 5 and 6) to rotate the array of holders 260 in a generally circular path about the longitudinal axis defined by the shaft 265. The mechanism 280 is arranged to index the array of decking member holders 260 in the generally circular path in such manner that each holder 20 remains in the receiving position for a sufficient time to receive one of the stringers 212 being fed by the feeding mechanism 222.

The mechanism 280 is controlled by a programmable controller D shown diagrammatically. The mechanism 280 is actuatable to rotate the rotary framework 250 in the forward direction and is arranged to be selectively actuated and deactuated. As shown in FIGS. 5 and 6, a photoelectric sensor 282 is mounted to a crosspiece 284 of the supporting framework 220. The sensor 282 is connected operatively to the programmable controller D.

As shown in FIG. 1, the mechanism 280 comprises an electric motor 288, which has a driving connection (not shown) to the shaft 256. As shown in FIGS. 5 and 6, the mechanism 280 comprises a doubleacting, pneumatic, piston-cylinder mechanism 290 having a piston rod 292, a sprocket wheel 294 having a circumferential array of teeth 296 with depressions 298 between the teeth 296, and a pawl mechanism 300. The electric motor 288 is arranged to be selectively actuated and deactuated, via the programmable controller D, and has a driving connection (not shown) to the shaft 256. The piston-cylinder mechanism 280 is connected to a source (not shown) of pressurized air and is controlled by valves (not shown) which are controlled by the programmable controller D. The sprocket wheel 294 is mounted to the rotary framework 250 for conjoint rotation with such framework 250. The pawl mechanism 300 is driven by the piston-cylinder mechanism 290 and is coactive with the teeth 296, as explained below, so as to arrest the sprocket wheel 294 when the piston-cylinder mechanism 290 is actuated so as to extend the piston rod 292.

Via the programmable controller D, the sensor 282 is arranged not only to actuate the electric motor 288 so as to rotate the shaft 256 in the forward direction but also to actuate the piston-cylinder mechanism 280 so as to retract the piston rod 292, when the sensor 282 begins to detect a stringer 212 being fed past the sensor 282 by the conveyor belt 24. Also, the sensor 282 is arranged to deactuate the conveyor belt 224 and the electric motor 288 if a stringer 212 sensed by the sensor 292 does not pass the sensor 282 within a predetermined time controlled by the programmable controller D, e.g. 1.5 seconds.

The pawl mechanism 300 comprises a link 310, which is mounted pivotally to a crosspiece 312 of the supporting framework 220, via a pin 314. The link 310 has a proximal end 316, which is connected pivotally to the piston rod 292, via a pin 318, and a distal end 320. A roller 322 is mounted rotatably to the link 310, near the distal end 320. When the piston-cylinder mechanism 290 is actuated so as to extend the piston rod 292, the link 310 is pivoted so as to drive the roller 322 into a depression 298 of the sprocket wheel 294, whereby the sprocket wheel 294 is arrested. When the piston-cylinder mechanism 294 is actuated so as to retract the piston rod 292, the link 310 is pivoted oppositely, whereby the sprocket wheel 294 is released.

A proximity detector 328, which is connected operatively to the programmable controller D, is arranged to detect the sprocket teeth 296 as the sprocket wheel 294 is rotated. The proximity detector 328 is arranged to deactuate the electric motor 282 and simultaneously to actuate the piston-cylinder mechanism 280, via the valves controlled by the programmable controller D, so as to extend the piston rod 292, whereby the sprocket wheel 294, the rotary framework 250, and the array of holders 260 are arrested, when the proximity detector 328 detects that the sprocket wheel 294 has been rotated for a sufficient amount of angular rotation to move one holder 260 from the receiving position and to move another holder 260 into the receiving position. As shown, each depression 298 is centered angularly on the sprocket wheel 294 where one holder 260 is centered angularly in the generally circular array, whereby angular rotation of one tooth 296 past the proximity detector 328 is sufficient to do so.

A longitudinally extending bar 330 is mounted fixedly to the supporting framework 220. The bar 330 is disposed to be stricken by each stringer 212, as the holder 260 holding such stringer 212 is moved past the bar 330, in such manner that the bar 330 knocks such stringer 212 from such holder 260. The supporting framework 220 mounts an array of inclined, longitudinally spaced, deflecting members 332, which are disposed to deflect the stringers 212 knocked from the holders 260 by the bar 330.

A conveyor 340, which is installed next to the accumulator 210, is disposed to receive the stringers 212 deflected by the deflecting members 332. As shown, the conveyor 340 comprises a wide, endless belt 342. The conveyor 340 is used to convey such stringers 212 away from the accumulator 212.

I claim:

1. A rotary accumulator for an indeterminate number of similar beams folded from corrugated paperboard, multi-ply paper, or similar material with an adhesive applied to each beam and intended to maintain such beam in a desired configuration when the adhesive has cured, the rotary accumulator comprising
    (a) a supporting framework,
    (b) means for feeding the beams successively and longitudinally in the desired configuration,
    (c) means comprising a rotary framework mounted rotatably to the supporting framework and a generally circular array of beam holders similar to each other, mounted to the rotary framework, and rotatable with the rotary framework for receiving each beam from the feeding means in one of the beam holders at a receiving position and for holding such beam in the desired configuration in the beam holder receiving such beam, (d) means for rotating the rotary framework so as to rotate the array of beam holders in a generally circular path about a longitudinal axis, and (e) means for removing each beam from the beam holder holding such beam after the beam holder holding such beam has been moved from the receiving position over a substantial portion of the generally circular path, whereby each beam is held by one of the beam holders for a finite time intended to permit the adhesive applied to such beam to cure wherein the feeding means is arranged to feed the beams continuously with a space between each beam being fed and the next beam being fed, wherein the rotating means is actuatable to index the array of beam holders in the generally circular path in such manner that each beam holder remains in the receiving position for a sufficient time to receive one of the beams being fed by the feeding means and to rotate the rotary framework in a forward direction for a timed interval, wherein the rotary accumulator comprises means for sensing such a beam being fed by the feeding means and for actuating the rotating means for such an interval when the sensing means begins to sense such a beam, the sensing means being arranged to deactuate the feeding means and the rotating means if a beam sensed by the sensing means does not pass the sensing means within a predetermined time, and wherein the rotating means comprises a piston-cylinder mechanism, a sprocket wheel mounted to the rotary framework for conjoint rotation with the rotary framework and with the array of beam holders and provided with a circumferential array of teeth, and means for comprising an escapement mechanism driven by the piston-cylinder mechanism and coactive with the teeth for indexing the sprocket wheel so as to index the array of beam holders.

2. The rotary accumulator of claim 1 wherein the rotating means comprises a proximity detector arranged to detect the teeth as the sprocket wheel is rotated and to actuate the piston-cylinder mechanism, so as to arrest the sprocket wheel when the proximity detector detects that the sprocket wheel has been rotated for a sufficient amount of angular rotation to move one of the beam holders from the receiving position and to move another of the beam holders into the receiving position.

3. A rotary accumulator for an indeterminate number of similar beams folded from corrugated paperboard, multi-ply paper, or similar material with an adhesive applied to each beam and intended to maintain such beam in a desired configuration when the adhesive has cured, the rotary accumulator comprising (a) a supporting framework, (b) means for feeding the beams successively and longitudinally in the desired configuration, (c) means comprising a rotary framework mounted rotatably to the supporting framework and a generally circular array of beam holders similar to each other, mounted to the rotary framework, and rotatable with the rotary framework for receiving each beam from the feeding means in one of the beam holders at a receiving position and for holding such beam in he desired configuration in the beam holder receiving such beam, (d) means for rotating the rotary framework so as to rotate the array of beam holders in a generally circular path about a longitudinal axis, and (e) means for removing each beam from the beam holder holding such beam after the beam holder holding such beam has been moved from the receiving position over a substantial portion of the generally circular path, whereby each beam is held by one of the beam holders for a finite time intended to permit the adhesive applied to such beam to cure wherein the feeding means is arranged to feed the beams continuously with a space between each beam being fed and the next beam being fed, wherein the rotating means is actuatable to index the array of beam holders in the generally circular path in such manner that each beam holder remains in the receiving position for a sufficient time to receive one of the beams being fed by the feeding means, and wherein the rotating means comprises an electric motor mounted on the supporting framework and arranged to be thus actuated via the sensing means, a sprocket wheel mounted to the rotary framework for conjoint rotation with the rotary framework and with the array of beam holders and provided with a circumferential array of teeth, and means comprising a piston-cylinder mechanism and a pawl driven by the piston-cylinder mechanism and coactive with the teeth for deactuating the electric motor and arresting the sprocket wheel when the rotary framework has been rotated for a sufficient angle to move one of the beam holders from the receiving position and to move another of the beam holders into the receiving position.

4. The rotary accumulator of claim 3 wherein the rotating means comprising a proximity detector arranged to operate the piston-cylinder mechanism so as to arrest the sprocket wheel whenever the proximity detector detects that the sprocket wheel has been rotated for a sufficient amount of angular rotation to move one of the beam holders from the receiving position and to move another of the beam holders into the receiving position.

5. A rotary accumulator for an indeterminate number of similar beams folded from corrugated paperboard, multi-ply paper, or similar material with an adhesive applied to each beam and intended to maintain such beam in a desired configuration when the adhesive has cured, the rotary accumulator comprising (a) a supporting framework, (b) means for feeding the beams successively and longitudinally in the desired configuration, (c) means comprising a rotary framework mounted rotatably to the supporting framework and a generally circular array of beam holders similar to each other, mounted to the rotary framework, and rotatable with the rotary framework for receiving each beam from the feeding means in one of the beam holders at a receiving position and for holding such beam in the desired configuration in the beam holder receiving such beam, (d) means for rotating the rotary framework so as to rotate the array of beam holders in a generally circular path about a longitudinal axis, and (e) means for removing each beam from the beam holding such beam after the beam holder holding such beam has been moved from the receiving position over a substantial portion of the generally circular path, whereby each beam is held by one of the beam holders for a finite time intended to permit the adhesive applied to such beam to cure wherein the feeding means is arranged to feed the beams continuously with a space between each beam being fed and the next beam being fed, wherein the rotating means is actuatable to index the array of beam holders in the generally circular path in such manner that each beam holder remains in the receiving position for a sufficient time to receive one of the beams being fed by the feeding means, and wherein the supporting framework comprises an upper frame, which supports the rotary framework and the array of beam holders for conjoint rotation relative to the upper frame, and a lower frame, which supports the upper frame, and wherein the rotary accumulator comprises means for limiting a portion of the upper frame relative to the lower frame so as to lift the array of beam holders relative to the feeding means prior to rotating the array of beam holders.

6. The rotary accumulator of claim 5 wherein the upper frame is mounted pivotally to the lower frame so as to permit pivotal movement of the upper frame about a longitudinal axis near a given side of the upper frame, and wherein the lifting means is arranged to lift the upper frame near the other side of the upper frame so as to lift the array of beam holders relative to the feeding means prior to rotating the array of beam holders.

7. A rotary accumulator for similar beams folded from corrugated paperboard, multi-ply paper, or similar material with an adhesive applied to each beam to maintain such beam in a desired configuration when the adhesive has cured, the desired configuration being generally trapezoidal when viewed endwise with two parallel bases, namely a relatively wide base and a relatively narrow base, with two opposite, nonparallel sides extending between the relatively wide and relatively narrow bases, with two relatively widely spaced edges defining acute angles where the sides intersect the relatively wide base, and with two relatively narrowly spaced edges defining obtuse angles where the sides intersect the relatively narrow base, the rotary accumulator comprising
 (a) a supporting framework,
 (b) means for feeding the beams successively and longitudinally in the desired configuration with the relatively wide bases above the relatively narrow bases and with a space between each beam being fed and the next being fed,
 (c) means comprising a rotary framework mounted rotatably to the supporting framework and a generally circular array of beam holders similar to each other, mounted to the rotary framework, and rotatable with the rotary framework for receiving each beam in one of the beam holders at a receiving position and for holding such beam in the beam holder receiving such beam, each beam holder defining a laterally spaced pair of interior angles, which conform generally to the acute angles defined by the relatively widely spaced edges of each beam and which define a cavity having an open end and opening downwardly when such beam holder is in the receiving position, the cavity being configured to receive such a beam being fed into the open end by the feeding means while such beam holder remains in the receiving position,
 (d) means for rotating the rotary framework so as to index the array of beam holders in a generally circular path about a longitudinal axis in such manner that each beam holder remains in the receiving position for a sufficient time to receive such a beam being fed into the open end of such beam holder by the feeding means, and
 (e) means for removing each beam from the beam holder holding such beam after the beam holder holding such beam has been moved from the receiving position over a substantial portion of the generally circular path.

8. The rotary accumulator of claim 7 wherein the removing means comprises a bar mounted to the supporting framework and disposed so as to be stricken by such a beam being held by a given one of the beam holders as the given one of the beam holders is moved past the longitudinal member.

9. The rotary accumulator of claim 8 wherein the bar is moveable over a limited range of lateral motion toward and away the array of beam holders, the longitudinal member being biased toward the array of beam holders.

10. An accumulator for an indeterminate number of similar beams folded from corrugated paperboard, multiply paper, or similar material with an adhesive applied to each beam and intended to maintain such beam in a desired configuration when the adhesive has cured, the desired configuration being generally trapezoidal when viewed endwise with two parallel bases, namely a relatively wide base and a relatively narrow base, with two opposite, nonparallel sides extending between the relatively wide spaced edges defining acute angles where the sides intersect the relatively wide base, and with two relatively narrowly spaced edges defining obtuse angles where the sides intersect the relatively narrow base, the accumulator comprising
 (a) means for feeding the beams successively and longitudinally in the desired configuration,
 (b) means comprising an array of beam holders similar to each other for receiving each beam from the feeding means in one of the beam holders at a receiving position and for holding such beam in the desired configuration in the beam holder receiving such beam, each beam holder conforming generally to the acute angles defined by the relatively widely spaced edges of each beam, each beam holder defining a cavity having an open end and opening downwardly when such beam holder is in the receiving position, the cavity being configured to receive such a beam being fed into the open end by the feeding means while such beam holder remains in the receiving position,
 (d) means for moving the array of beam holders in a direction other than longitudinal, and
 (e) means for removing each beam from the beam holder holding such beam after the beam holder holding such beam has been moved from the receiving position for a finite time,
whereby each beam is held by one of the beam holders for a finite time intended to permit the adhesive applied to such beam to cure.

11. The accumulator of claim 10 wherein each beam holder defines a laterally spaced pair of interior angles conforming generally to the acute angles defined by the relatively widely spaced edges of each beam.

12. The accumulator of claim 10 wherein the means for moving the array of beam holders in a direction other than longitudinal comprises means for rotating the array of beam holders in a generally circular path about a longitudinal axis.

13. The rotary accumulator of claim 12 wherein the feeding means is arranged to feed the beams continuously with a space between each beam being fed and the next beam being fed.

14. The rotary accumulator of claim 13 wherein the rotating means is actuatable to index the array of beam holders in the generally circular path in such manner that each beam holder remains in the receiving position for a sufficient time to receive one of the beams being fed by the feeding means.

15. The accumulator of claim 14 wherein the rotating means is actuatable to rotate the rotary framework in a forward direction for a timed interval and wherein the rotary accumulator comprises means for sensing such a beam being fed by the feeding means and for actuating the rotating means for such an interval when the sensing means begins to sense such a beam.

16. The accumulator of claim 4 wherein he sensing means is arranged to deactuate the feeding means and the rotating means if a beam sensed by the sensing means does not pass the sensing means within a predetermined time.

* * * * *

UNITED STATES PATENT AND TRADEMARK OFFICE
CERTIFICATE OF CORRECTION

PATENT NO. : 5,154,687            Page 1 of 3

DATED : October 13, 1992

INVENTOR(S) : David K. Jeslis

It is certified that error appears in the above-identified patent and that said Letters Patent is hereby corrected as shown below:

Col. 4, line 21, "upper side" should be --other side--.

Col. 4, line 27, "s" should be --is--.

Col. 5, line 55, "nd" should be --and--.

Col. 5, line 67 unnecessary "a" should be removed from before "its".

Col. 7, line 62, "he" should be --the--.

Col. 8, line 4, "1340" should be --130--.

Col. 8, line 33, "he" should be --the--.

Col. 8, line 36, "toot" should be --tooth--.

Col. 8, line 53, "lit" should be --lift--.

Col. 8, line 57, "where" should be --there--.

UNITED STATES PATENT AND TRADEMARK OFFICE
CERTIFICATE OF CORRECTION

PATENT NO. : 5,154,687

DATED : October 13, 1992

INVENTOR(S) : David K. Jeslis

It is certified that error appears in the above-identified patent and that said Letters Patent is hereby corrected as shown below:

Col. 9, line 3, "based" should be --biased--.

Col. 9, line 64, "12" should be --212--.

Col. 10, line 14, "22" should be --222--.

Col. 11, line 4, "flanges" should be --flanged--.

Col. 11, line 16 "20" should be --220--.

Col. 11, line 43, "doubleacting" should be hyphenated.

Col. 14, line 1, "he" should be --the--.

UNITED STATES PATENT AND TRADEMARK OFFICE
CERTIFICATE OF CORRECTION

PATENT NO. : 5,154,687

DATED : October 13, 1992

INVENTOR(S) : David K. Jeslis

It is certified that error appears in the above-identified patent and that said Letters Patent is hereby corrected as shown below:

Col. 14, line 67, claim 5, in subparagraph (e), --holder-- should be inserted after "beam".

Col. 14, line 38 (claim 4) "comprising" should be --comprises--.

Col. 15, line 19, "limiting" should be --lifting--.

Col. 17, line 4, "rotary" should have been deleted per our Amendment filed April 30, 1992.

Col. 17, line 8, "rotary" should have been deleted per our Amendment filed April 30, 1992.

Col. 18, line 8 (claim 16) "he" should be --the--.

Signed and Sealed this

Ninth Day of November, 1993

*Attest:*

BRUCE LEHMAN

*Attesting Officer*   *Commissioner of Patents and Trademarks*